US012626300B1

(12) United States Patent
Godse et al.

(10) Patent No.: US 12,626,300 B1
(45) Date of Patent: May 12, 2026

(54) CROSS-SYSTEM INTEGRATION PLATFORM

(71) Applicant: UNITED SERVICES AUTOMOBILE ASSOCIATION (USAA), San Antonio, TX (US)

(72) Inventors: Hrishikesh Madhukar Godse, Prosper, TX (US); Jason Christopher Bostic, Boerne, TX (US); Elizabeth Poland Smith, Castroville, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/800,966

(22) Filed: Aug. 29, 2024

Related U.S. Application Data

(63) Continuation of application No. 17/858,683, filed on Jul. 6, 2022, now Pat. No. 12,079,866.

(51) Int. Cl.
G06Q 40/03 (2023.01)

(52) U.S. Cl.
CPC .................................... G06Q 40/03 (2023.01)

(58) Field of Classification Search
CPC ....................................................... G06Q 40/03
See application file for complete search history.

(56) References Cited

U.S. PATENT DOCUMENTS

| | | | | |
|---|---|---|---|---|
| 11,127,080 B1* | 9/2021 | Brocato | .................... | G06F 8/38 |
| 11,205,233 B1* | 12/2021 | Callahan | ................ | G06Q 40/12 |
| 2021/0224900 A1* | 7/2021 | Marusic | ................ | G06Q 40/02 |
| 2023/0169486 A1* | 6/2023 | Dubois | ................ | G06Q 20/401 |
| | | | | 705/38 |

* cited by examiner

*Primary Examiner* — Bennett M Sigmond
*Assistant Examiner* — Marla Hudson
(74) *Attorney, Agent, or Firm* — Fletcher Yoder, P.C.

(57) ABSTRACT

A system includes an intermediate mortgage integration platform as a service (MiPaas). Specifically, an MiPaas layer may facilitate integration between a loan origination system (LOS) and supporting services. The MiPaas layer may provide integration flexibility by enabling integration of the supporting services with each other and with different LOSs. Indeed, a number of MiPaas integration formats (e.g. REST API, OpenAPI, GRPC, GraphQL, Industry Standard interface, etc. may be provided to facilitate ease of integration between the LOS and the supporting services. Further, the MiPaas may provide processing efficiencies by adapting workflows based upon particular retrieved data. In this manner, efficient processing may be performed in an intermediate data processing layer, resulting in more efficient turnaround times and reduced processing requirements at traditionally over-burdened systems.

16 Claims, 12 Drawing Sheets

CROSS-SYSTEM INTEGRATION PLATFORM

CROSS-REFERENCE TO RELATED APPLICATIONS

This application is a continuation of U.S. patent application Ser. No. 17/858,683, entitled "CROSS-SYSTEM INTEGRATION PLATFORM", filed on Jul. 6, 2022, which is incorporated by reference herein in its entirety for all purposes.

BACKGROUND

The present disclosure relates generally to systems and methods related to integration of cross-platform standards. More specifically, the present disclosure relates to an integration platform that provides effective data transfer across disparate third-party systems.

Third-party devices may include smart devices that use sensors to monitor the environment of a customer and that send data to a third-party. For example, the customer may own multiple third-party devices (e.g., smart home devices, wearables, security systems) that generate data in real-time or near real-time and store the data in a remote server that is accessible by a manufacture of the third-party device. While third-party devices may empower the owner to better understand their environment, the aggregation of data from multiple third-party devices may create privacy and security risks. As such, improved systems and methods for managing and protecting the data of third-party customers or owners are desired.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments provided herein relate to a mortgage integration platform as a service (MiPaas). Specifically, an MiPaas layer may facilitate integration between a loan origination system (LOS) and $3^{rd}$ party vendor supporting services for originating and servicing loans. The MiPaas layer may provide integration flexibility by enabling integration of the supporting services with each other and with different LOSs. Indeed, a number of MiPaas integration formats (e.g., REST API, OpenAPI, GRPC, GraphQL, File Transfer Protocols, Industry Data Standards based integration, etc.) may be provided to facilitate ease of integration between the LOS and the supporting services. Further, the MiPaas may provide processing efficiencies by adapting workflows based upon particular retrieved data. In this manner, efficient processing may be performed in an intermediate data processing layer, resulting in more efficient turnaround times and reduced processing requirements at traditionally over-burdened systems.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to systems and methods for efficient integration between one or more loan origination systems (LOSs) and supporting services (e.g., "vendor services"). A mortgage integration platform as a service (MiPaas) integrates with LOSs and the vendor services and acts as a middleman, providing data from the vendor services to the LOSs and vice versa. In contrast to LOS-specific integrations, which provide a single integration for a particular LOS, by creating non-LOS specific integrations, a single integration between a vendor service and the MiPaas may be utilized with a number of different LOSs. Further, data processing that has traditionally been implemented at the LOS may be offloaded to the MiPaas, creating data processing efficiencies. For example, data processing may occur once for multiple LOSs that integrate with the MiPaas, creating more processing efficiencies and reducing processing workloads.

Figure 1:
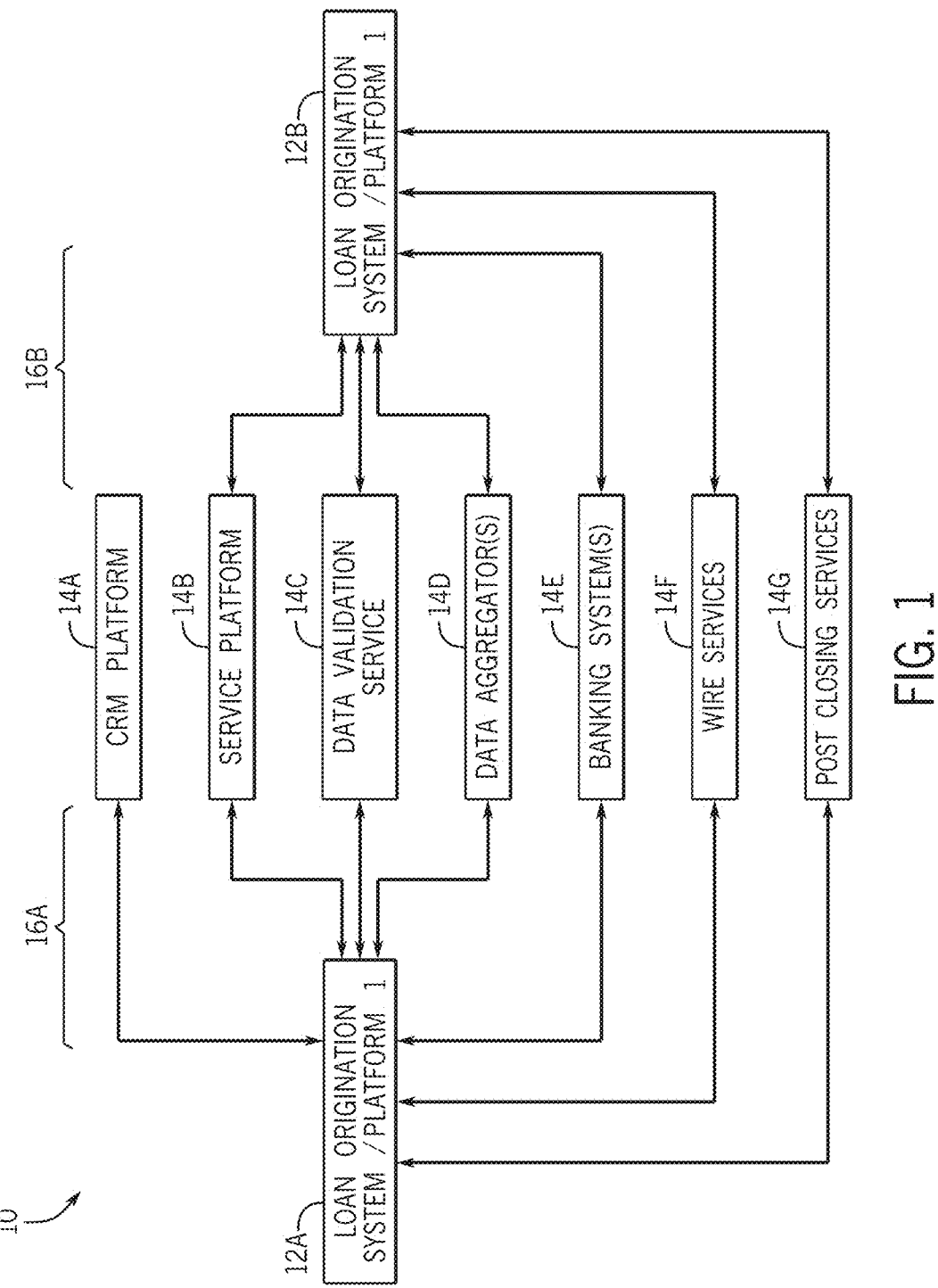
FIG. 1 is a schematic diagram, illustrating a Loan Origination System (LOS) directly coupled to vendor services.

FIG. 1 is a schematic diagram, illustrating a system 10 where Loan Origination Systems (LOSs) 12A and 12B are directly coupled to vendor services (e.g., CRM platform 14A, Servicing platform 14B, Data Validation Service 14C which may also comprise loan QA/QC, and regulatory compliance controls validations, Data Aggregator(s) 14D, Wires Money Transfer service 14F, Post Closing Service 14G, and/or other Banking System(s) 14E) via integration sets 16A and 16B. As illustrated, two sets of integration sets, 16A and 16B, are used to integrate with corresponding LOSs 12A and 12B. Indeed, different LOSs may be controlled by different vendors, having different coding requirements for integrating with different vendor services. This may result in duplicated integration efforts between the vendor services (e.g., 14A-14G) and the LOSs (e.g., 12A and 12B). Further, having multiple integration sets 16A and 16B may result in code bloat, more difficulty in updating integrations, and may introduce more areas for possible coding errors.

Further, in some instances, vendors may not allow and/or provide integrations between vendor services and a particular LOS. For example, as illustrated in FIG. 1, the integration set 16B may not have an available integration between the CRM platform 14A and the LOS 12B. Indeed, in some instances, a particular vendor may attempt to thwart integrations to push LOS users to a desired alternative vendor service (e.g., an alternative CRM platform).

Figure 2:
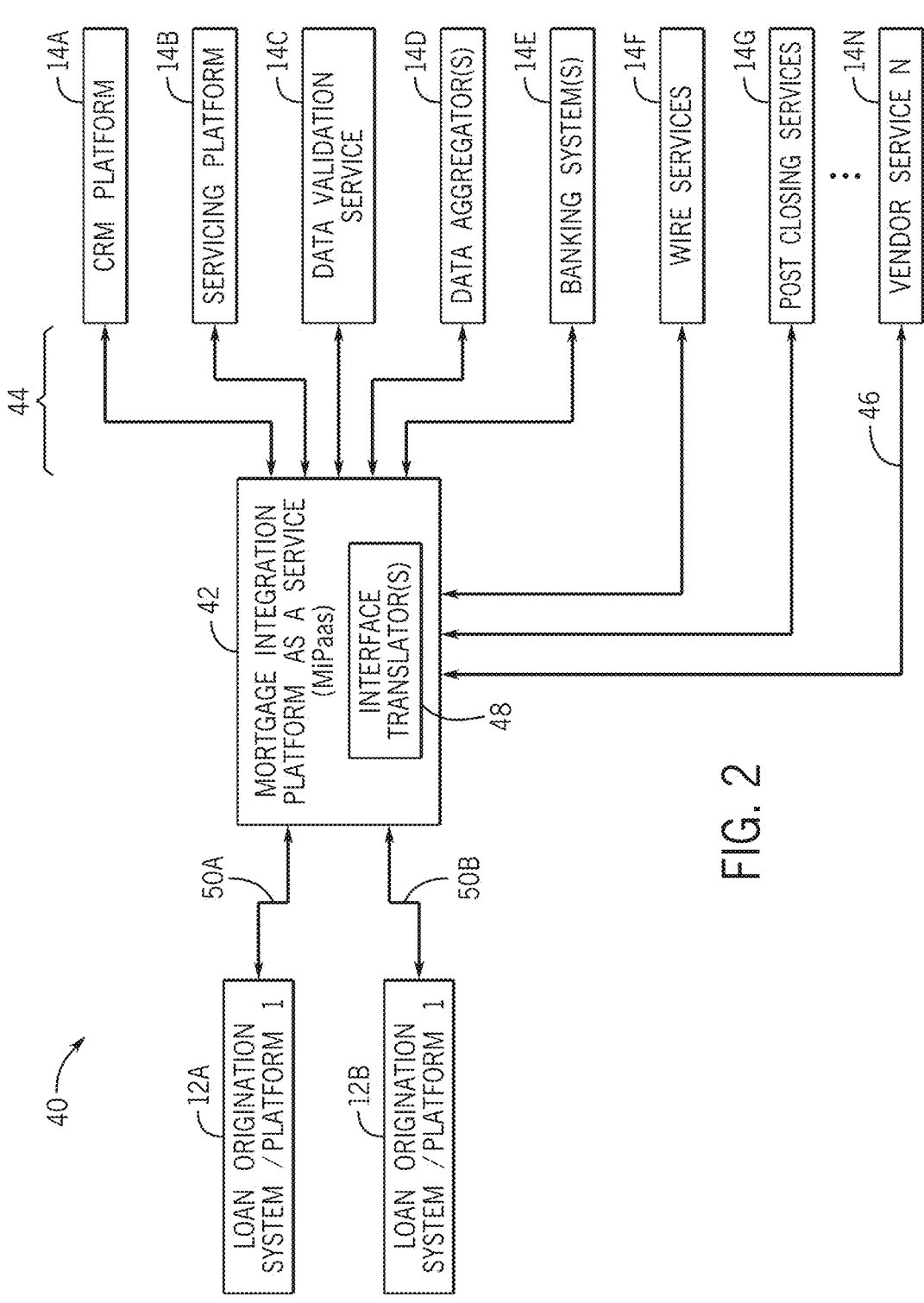
FIG. 2 is a schematic diagram, illustrating a Mortgage Integration Platform as a Service (MiPaas) that provides integration between vendor services and a LOS, in accordance with certain embodiments of the current application.

To solve these and other problems, a Mortgage Integration Platform as a Service (MiPaas) may be implemented between the LOS system (e.g., 12A and/or 12B) and certain vendor services (e.g., 14A-14G). FIG. 2 is a schematic diagram, illustrating a system 40 where a Mortgage Integration Platform as a Service (MiPaas) 42 provides integration between vendor services 14A-14G and a LOS 12A, in accordance with certain embodiments of the current application. As illustrated, a single set of integrations 44 is generated between the vendor services 14A-14G and the MiPaas 42. In this manner, the reduced set of integrations may reduce code bloat, reduce difficulty in updating integrations, and reduce locations where errors may be introduced in integration coding. Further, as new vendor services are developed and desired for use (e.g., vendor service 14N) a single integration 46 between the vendor service 14N and the MiPaas 42 may be generated to allow integration of the vendor service 14N with LOSs integrated with the MiPaas 42 (e.g., LOS12A and LOS 12B).

The MiPaas may include one or more interface translators 48 that provide particular interfaces that may be utilized by the LOSs to integrate with the MiPaas 42. For example, interface translators 48 may provide interfaces including, but not limited to: a Representational State Transfer (REST) API interface, an OpenAPI interface, a Google Remote Procedure Call (gRPC) interface, Secured File Transfer Protocol (SFTP), GraphQL, Industry Data Standard interface, etc. An interface (e.g., 50A and/or 50B) may be generated between the LOSs (e.g., LOS 12A and/or LOS 12B) and one or more of the interfaces provided by the MiPaas 42 via interface translator(s) 48. For example, LOS 12A may access the MiPaas 42 via interface 50A, which makes use of a provided Industry Data Standards interface. Further, LOS 12B may access the MiPaas 42 via interface 50B, which makes use of a provided REST API interface.

Figure 3:
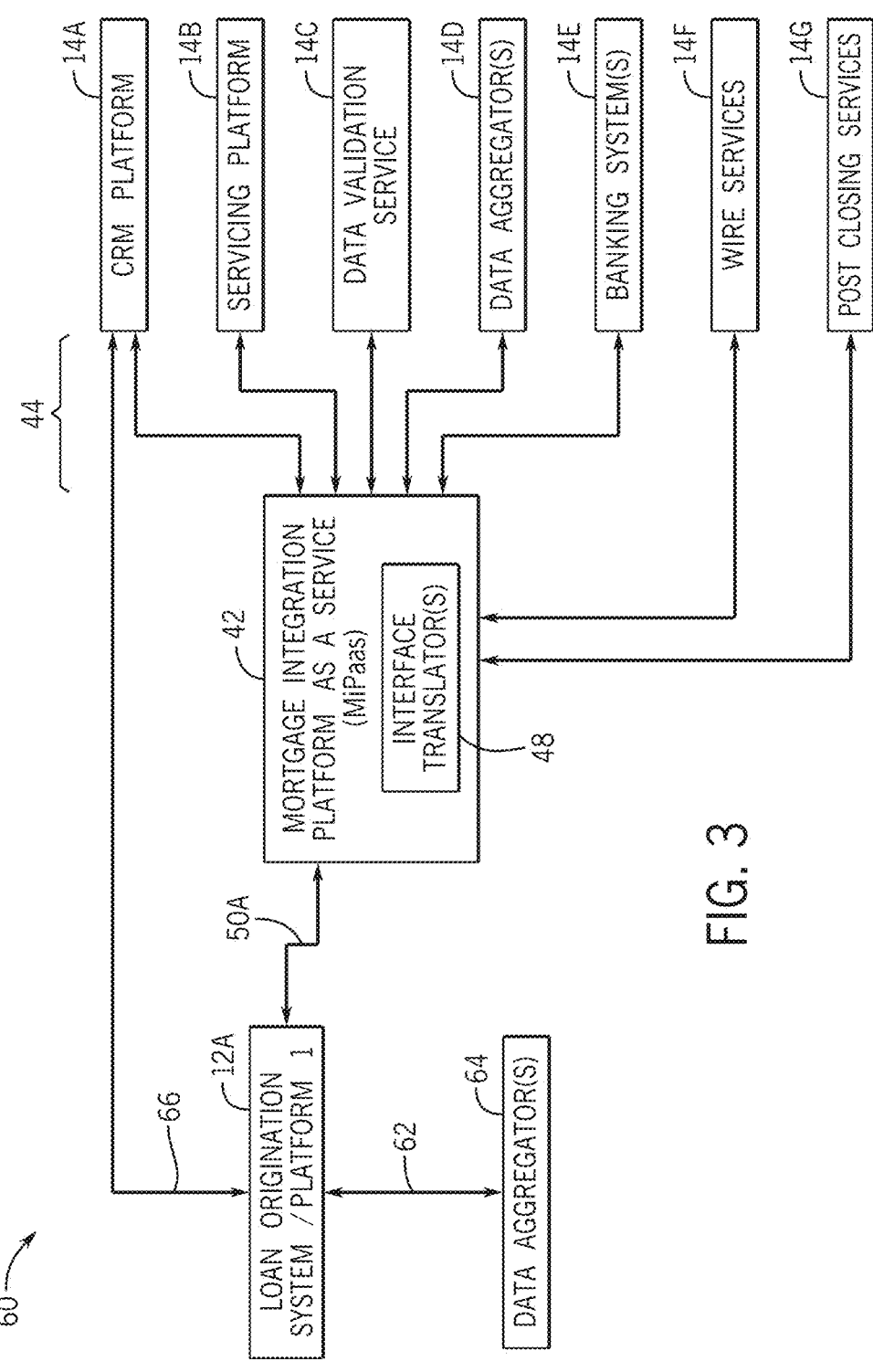
FIG. 3 is a schematic diagram of an MiPaas integrating vendor services integrated with an LOS with non-LOS integrations, in accordance with certain embodiments of the current application.

In some embodiments, vendor service integrations with an LOS may already exist. FIG. 3 is a schematic diagram of a system 60 where an MiPaas provides hybrid integrations with vendor services integrated with an LOS and non-LOS integrations that integrate with the MiPaas, in accordance with certain embodiments of the current application.

As illustrated, in FIG. 3, the LOS 12A may have an integration 62 with an accounting service 64 and an integration 66 with the Customer Relationship Management (CRM) platform 14A. The MiPaas 42 may include similar integrations as illustrated in FIGS. 1 and 2. Accordingly, in the current system 60, some data used by the LOS 12A may come from the vendor services (14A-14G) via integration set 44 with the MiPaas 42. Additionally, some data may be sourced from other services integrated directly with the LOS 12A (e.g., the accounting service 64 and the CRM platform 14A via the integrations 62 and 66, respectively). In situations where integrations for a particular vendor service exists directly with the LOS (e.g., LOS 12A) and also with the MiPaas 42, either and/or both integrations may be used.

Figure 4:
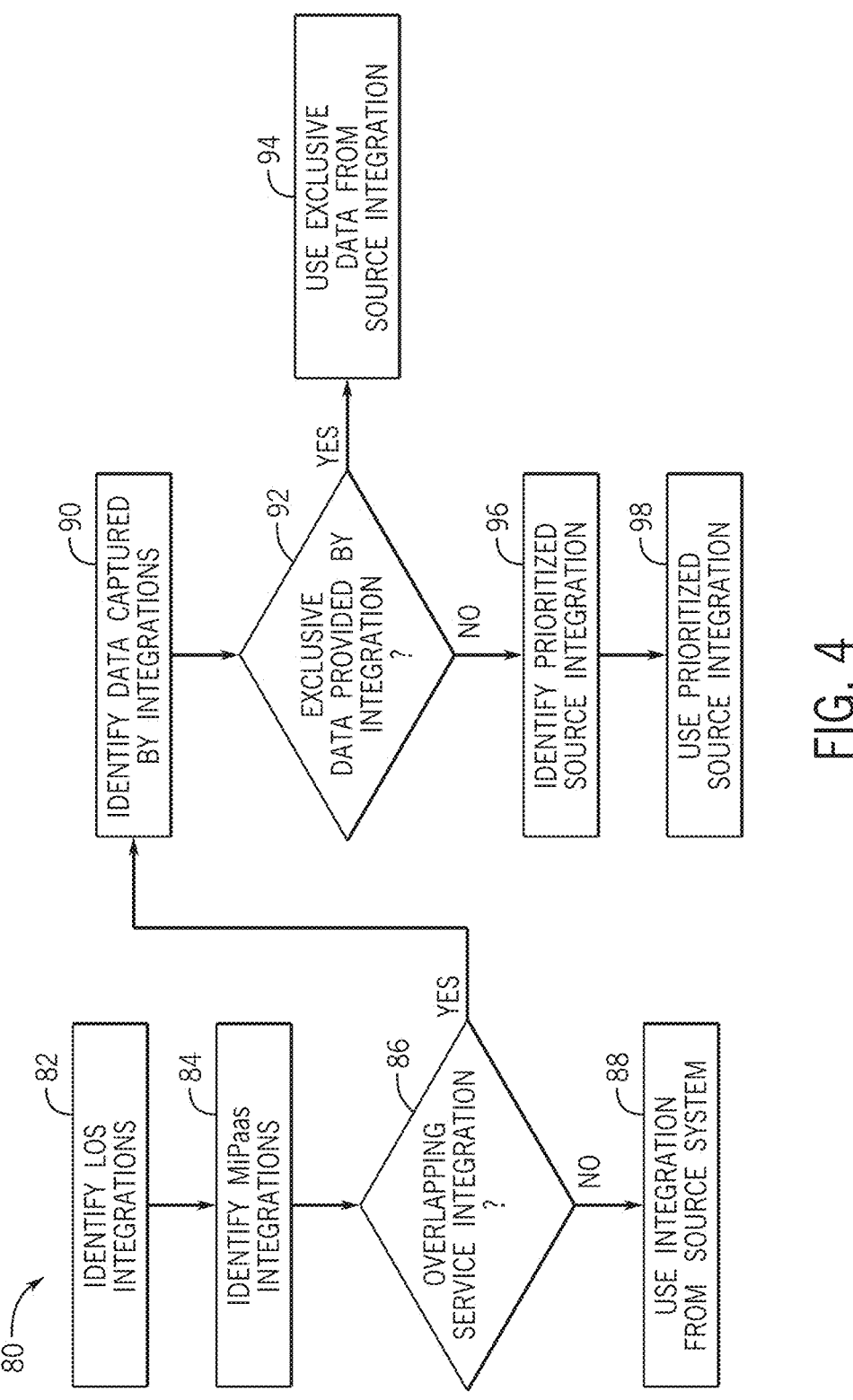
FIG. 4 is a flowchart, illustrating a process for implementing hybrid integrations, in accordance with certain embodiments of the current application.

FIG. 4 is a flowchart, illustrating a process 80 for implementing hybrid integrations, in accordance with certain embodiments of the current application. The process 80 begins with identifying LOS integrations (block 82). The LOS integrations may be identified, in some cases, by polling the LOS for an indication of integrations that active with the LOS. Further, the LOS may provide an indication (e.g., via an integration schema) of particular data that is being provided to the LOS via the direct LOS integrations.

The MiPaas integrations may also be identified (block 84). For example, a configuration file may be polled to identify active MiPaas integrations. Further, an indication of the data collected via these active integrations may also be identified.

At decision block 86, a determination is made, for each of the integrated services, as to whether there is an overlap in integrations (e.g., both an LOS direct integration and an MiPaas integration for a common service). For example, returning to FIG. 3, the vendor services 14B-14 and the accounting service 64 do not have overlapping integrations, as they only integrate with only one of the MiPaas 42 or the LOS 12A. However, the CRM platform 14A does include an overlapping integration, as it is both integrated with the LOS 12A and the CRM platform 14A.

For vendor services that do not have an overlapping service integration, the single integration of the source system is used (block 88). For example, the LOS direct integration with the accounting service 64 will be used. Further, the MiPaas integrations for vendor services 14B-14G will be used.

When there are overlapping integrations, the data captured by these integrations is determined (block 90). For example, a schema associated with these integrations may provide an indication of data provided by these integrations.

At decision block 92, a determination is made as to whether exclusive data is provided by any of the overlapping integrations. When exclusive data is captured by an overlapping integration, the integration capturing that exclusive data is used to obtain the exclusive data (block 94).

When non-exclusive data is obtained via the integrations, a prioritized integration is identified (block 96). A number of factors may be used to identify a prioritized integration. For example, to minimize the number of service integrations, in some embodiments, when only one of the integrations provides exclusive data and that integration provides the totality of the non-exclusive data as well, that integration may be used to provide the non-exclusive data as well, reducing the number of integrations. In some embodiments, a preference may be given to the MiPaas integrations, as these may provide more flexibility with other LOS systems and may also enable MiPaas processing, reducing a processing load on the LOS. In some embodiments, a user indication may be received via a graphical user interface (GUI) soliciting a preference of an integration for particular data. In such a case, the user indication may dictate the prioritized integration. The prioritized source integration is then used to capture the non-exclusive data (block 98).

Figure 5:
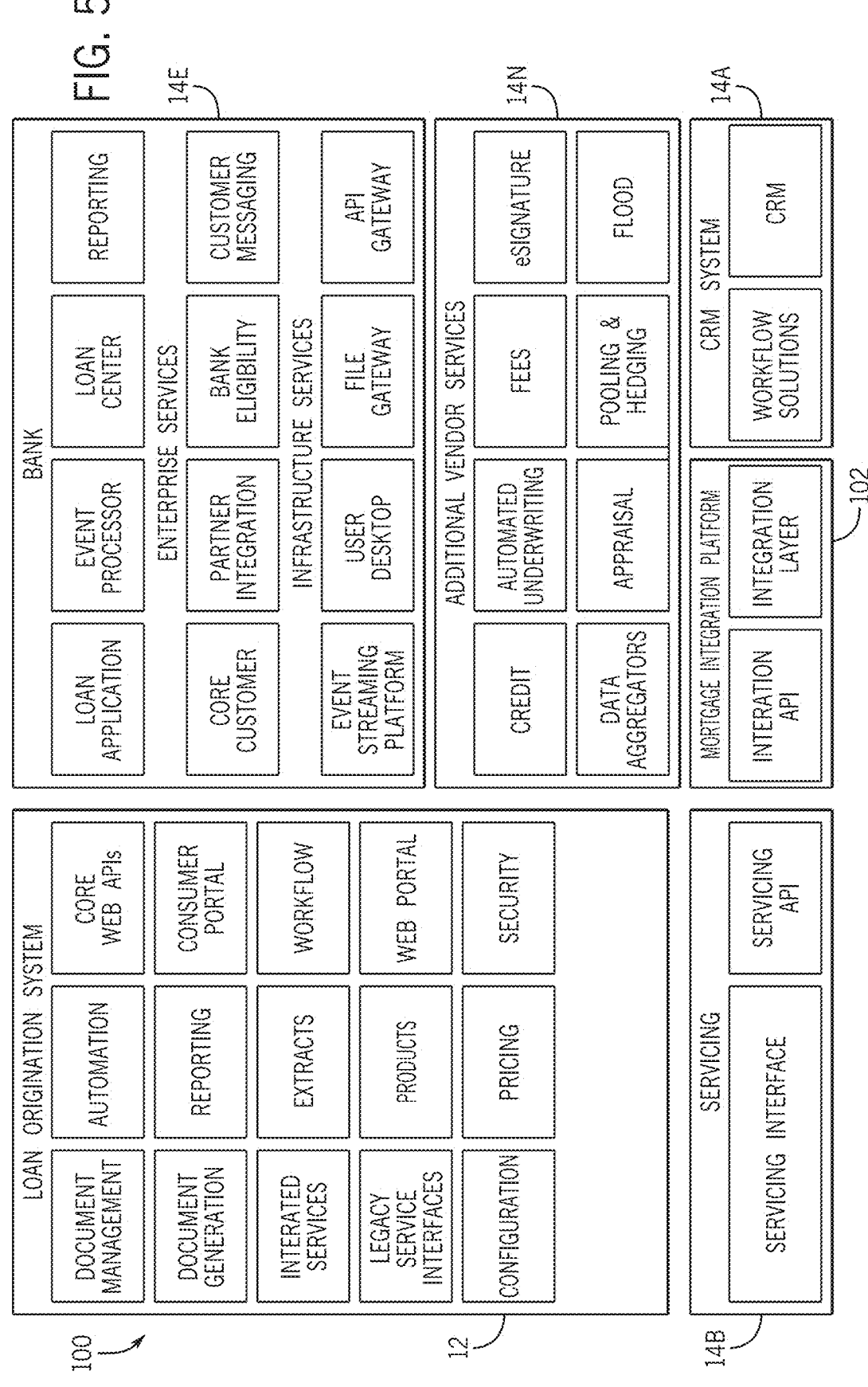
FIG. 5 is a block diagram, illustrating a list of components that may be integrated via the MiPaas, in accordance with certain embodiments of the current application.

Turning now to a discussion of various services that may be integrated with MiPaas. FIG. 5 is a block diagram, illustrating a list of services that may be integrated via the MiPaas, in accordance with certain embodiments of the current application. For example, the MiPaas may be implemented on an Integration Web Services Platform (e.g., the cloud-based infrastructure 102), such as Amazon Web Services (AWS), Google Cloud Platform (GCP) or Microsoft Azure Cloud, etc. Other integration services, such as Mortgage Rates Application Programming Interface (API) may be run on the Integration Web Services Platform (e.g., a cloud-based infrastructure 102) and may be integrated with the MiPaas.

As mentioned above, the MiPaas may integrate with one or more Loan Origination Systems 12. The LOS 12 includes many features that may integrate with the MiPaas, such as document management, document generation, Integrated Services, legacy service interfaces, tasking, workflow/automation engine(s), reporting, data extract services, Consumer Portal, product and pricing tools, security applications, core web APIs, web UI, and configuration tools.

In addition, the MiPaas may integrate with many vendor services, such as a customer relationship management (CRM) system, which may include not only the CRM system, but also workflow solutions for the CRM system. Additional integrations may include loan servicing platform(s) 14B, including one or more servicing interfaces for one or more loan servicing companies.

Banking system 14E may also be integrated via MiPaas. For example, banking point of sale applications, event processors, loan Application tracking system, and reporting databases may be integrated with MiPaas. Further, Enterprise Services, such as core customer service tools, partner integration tools, bank eligibility verification tools, and Customer messaging tools may be integrated. Infrastructure services, such as event streaming platforms, user desktop access applications, file gateways, and/or API gateways may also be integrated.

Further, additional vendor services 14N may be integrated. Such services may include credit scoring services, automated underwriting services, fee management services, electronic signature services, data aggregation services, appraisal services, pooling and hedging services, flood services, etc. may be integrated. As may be appreciated, a wide variety of components may be integrated via MiPaas, providing a thorough and end-to-end solution.

Figure 6:
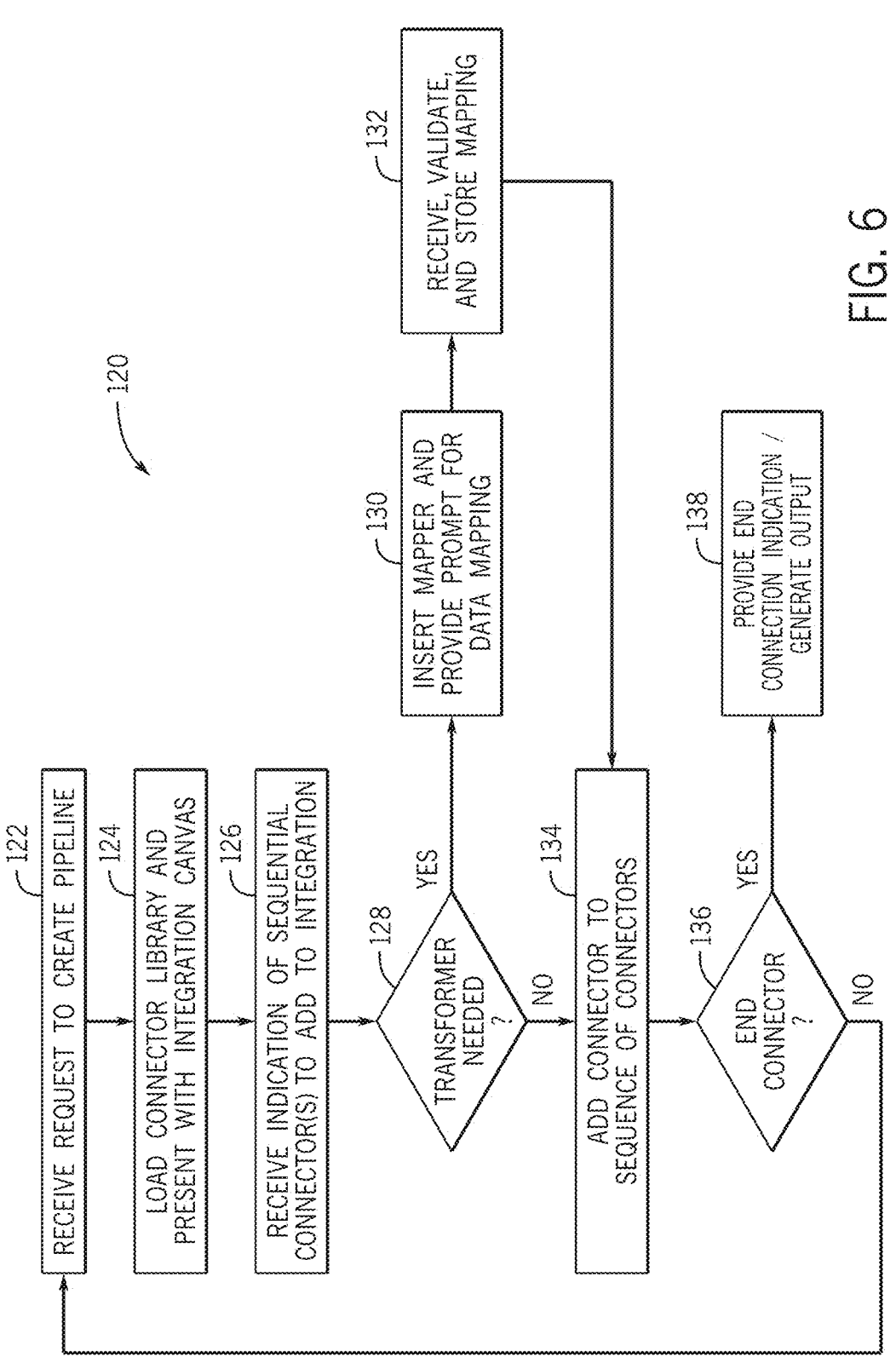
FIG. 6 is a flowchart, illustrating a process for creating a vendor services integration via the MiPaas, in accordance with certain embodiments of the current application.

Turning now to creating system integrations, the following discussion relates to creating connections between the LOS and the vendor services. FIG. 6 is a flowchart, illustrating a process 120 for creating a vendor services integrations via the MiPaas, in accordance with certain embodiments of the current application. The process 120 begins with receiving a request to create an Integration, where an Integrations a pathway for providing an interface to a service via the MiPaas (block 122).

Figure 7:
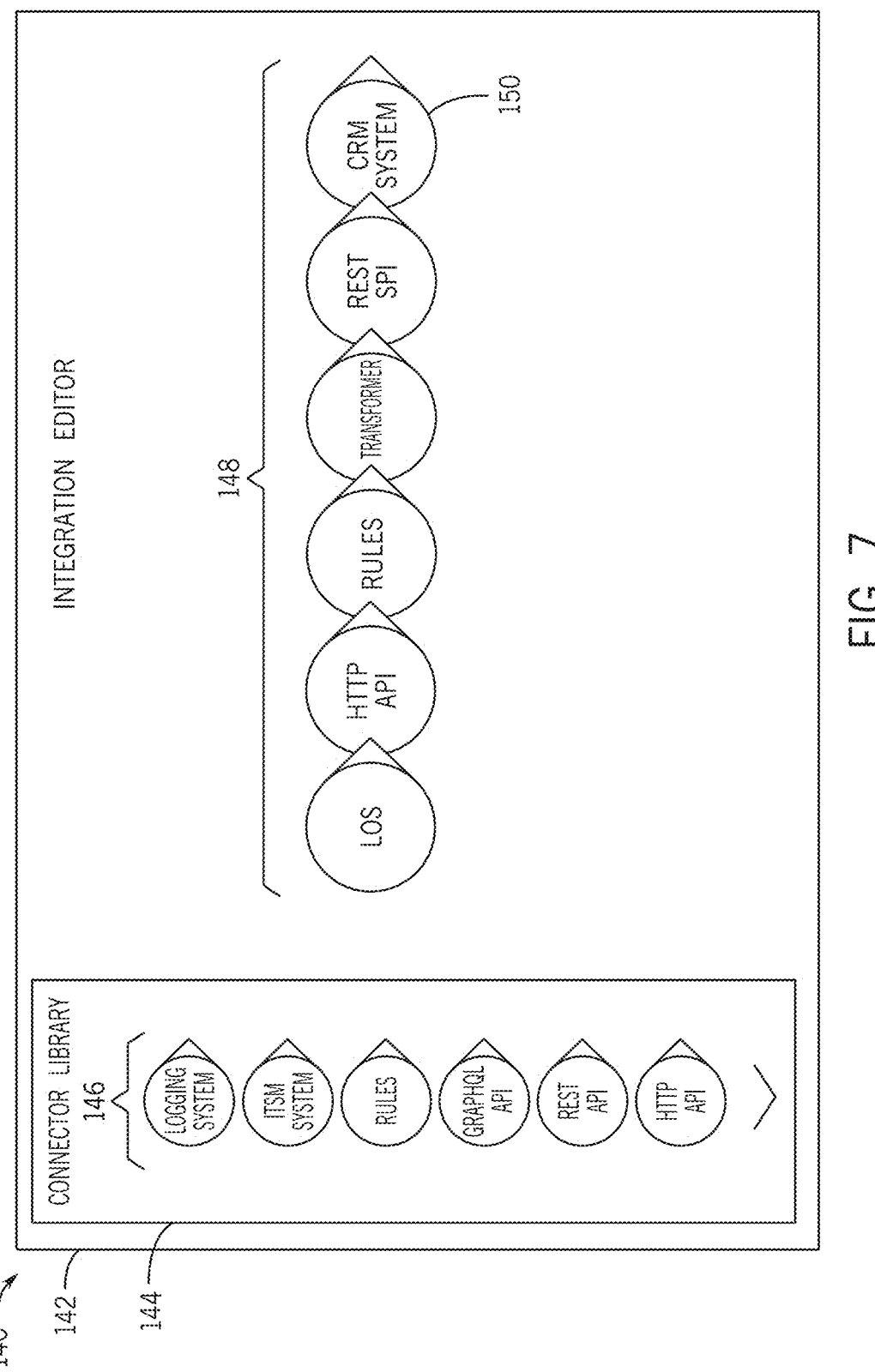
FIG. 7 is a schematic diagram, illustrating a graphical user interface (GUI) for creating a vendor services integration, in accordance with certain embodiments of the current application.

In response to receiving the request in block 122, a connector library of available integration components is loaded and an Integration canvas is presented via a graphical user interface (GUI) (block 124). FIG. 7 is a schematic diagram, illustrating an Integration Editor graphical user interface (GUI) 140 for creating a vendor services integrations, in accordance with certain embodiments of the current application. As illustrated, an Integration canvas 142 is rendered with a connector library 144 that includes a selectable list of pre-defined connectors 146 that can be dragged upon the Integration canvas 142 to create an Integration. Additional palettes may be provided that allows the implementers the processing flexibility and control using formulas, conditions, rules, formatting, validations, etc.

An indication of sequential connectors to add to the Integration is received (block 126). For example, one or more of the connectors 146 may be selected (e.g., via a drag operation) from connector library 144 and inserted into an Integration (e.g., via a drop operation).

As connectors are sequentially added, a determination is made as to whether a Transformer is needed (decision block 128). This may be done by determining whether the output of a sequentially leading connector matches the inputs of a sequentially following (next) connector. When the output of a leading connector and the input of a following/next connector do not match, a Transformer may be need.

Figure 8:
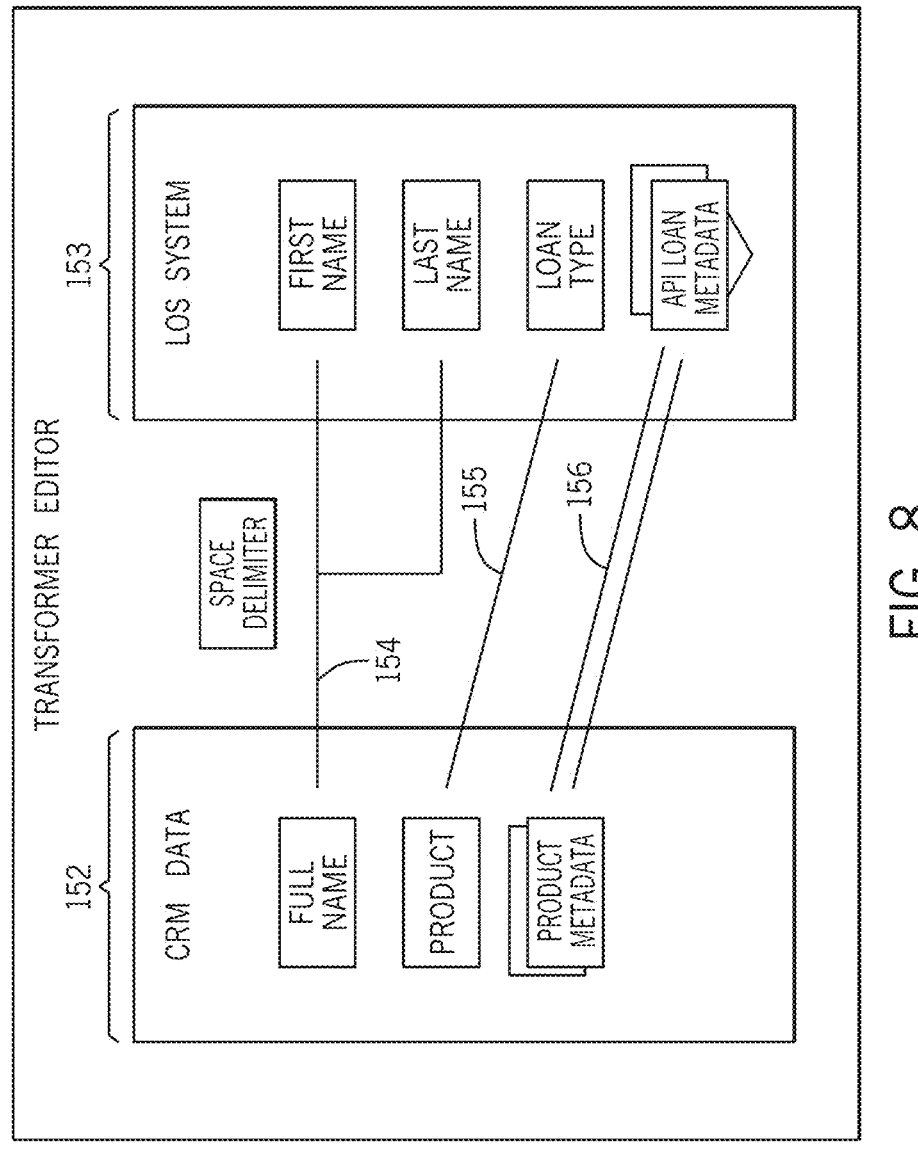
FIG. 8 is a schematic diagram, illustrating a graphical user interface (GUI) for creating a mapping between vendor services data and LOS data, in accordance with certain embodiments of the current application.

When a Transformer is determined to be needed, a Transformer may be inserted into the Integration automatically and prompt may be provided to enable the Transformer to be configured (block 130). FIG. 8 is a schematic diagram, illustrating a Transformer graphical user interface (GUI) 151 for creating a mapping between vendor services data and LOS data, in accordance with certain embodiments of the current application. The Transformer GUI 151 may provide a listing of leading connector outputs 152 and a listing of following/next connector inputs 153. For example, here, the CRM service connector outputs Full Name, Product, and Product Metadata fields of data. The LOS system receives as input First Name, Last Name, Loan Type, and Loan Metadata fields of data. Because these output and input fields do not match, the Transformer GUI 151 is rendered. Machine learning (ML) and/or other data pattern recognition schemes may be used to automatically generate suggestions for particular mappings of output fields to input fields. For example, a mapping link 154 may be automatically generated between the Full Name field and the First Name and Last Name fields with a space delimiter split, as illustrated in FIG. 8. This mapping link 154 may be automatically identified based upon data pattern detection schemes.

A user input may be used to provide manual mapping links between output fields and input fields. For example, a user may drag a mapping link 155 between the Product output field and the Loan Type input field to indicate a mapping between these two fields. In some embodiments, multiple mapping links may be provided for a group of fields. For example, here, multiple mapping links 156 map product metadata output fields to loan metadata input fields.

Returning to FIG. 6, when the mapping configuration is complete, the mapping is received, validated and stored (block 132). For example, a validation may include identifying whether data types of the mapped fields match and/or whether the data type of the input field can "hold" data of the output data type. Further, additional data requirements of the input data fields (e.g., no Nulls) etc. can be tested against a sample data set derived from the output fields.

When the mapping is verified and stored in block 132 and/or no Transformer is need (as determined in decision block 128) the connector indicated in block 126 is added to the sequence of connectors (block 134). This indicates that the output of the leading connector has been successfully joined to input of the following/next connector. As illustrated in FIG. 7, the CRM data connector has been joined to the LOS connector with an intermediate Transformer connector (e.g., inserted at block 130 of FIG. 6).

Next, a determination is made as to whether the added connector is an end connector (decision block 136). This may be discerned, in some embodiments, based upon a special connector type defining the interface translators that specify the particular interface provided by the MiPaas in the Integrations. For example, in FIG. 7, an Industry Standard API connector is added to the LOS connector, indicating that an Industry Standard API interface will result in the Integration 148. This type of connector signals the end of the Integration 148.

If the connector is not the end connector, the process 120 can repeat (e.g., returning to block 126 to receive an indication of a new connector to add to the Integration). When the end connector is identified, an end connection indication is rendered and the Integration code is generated (block 138). For example, a green indicator 150 is rendered at the end of the Integration 148 and configuration code for each of the connectors in the Integration 148 is generated and stored.

Figure 9:
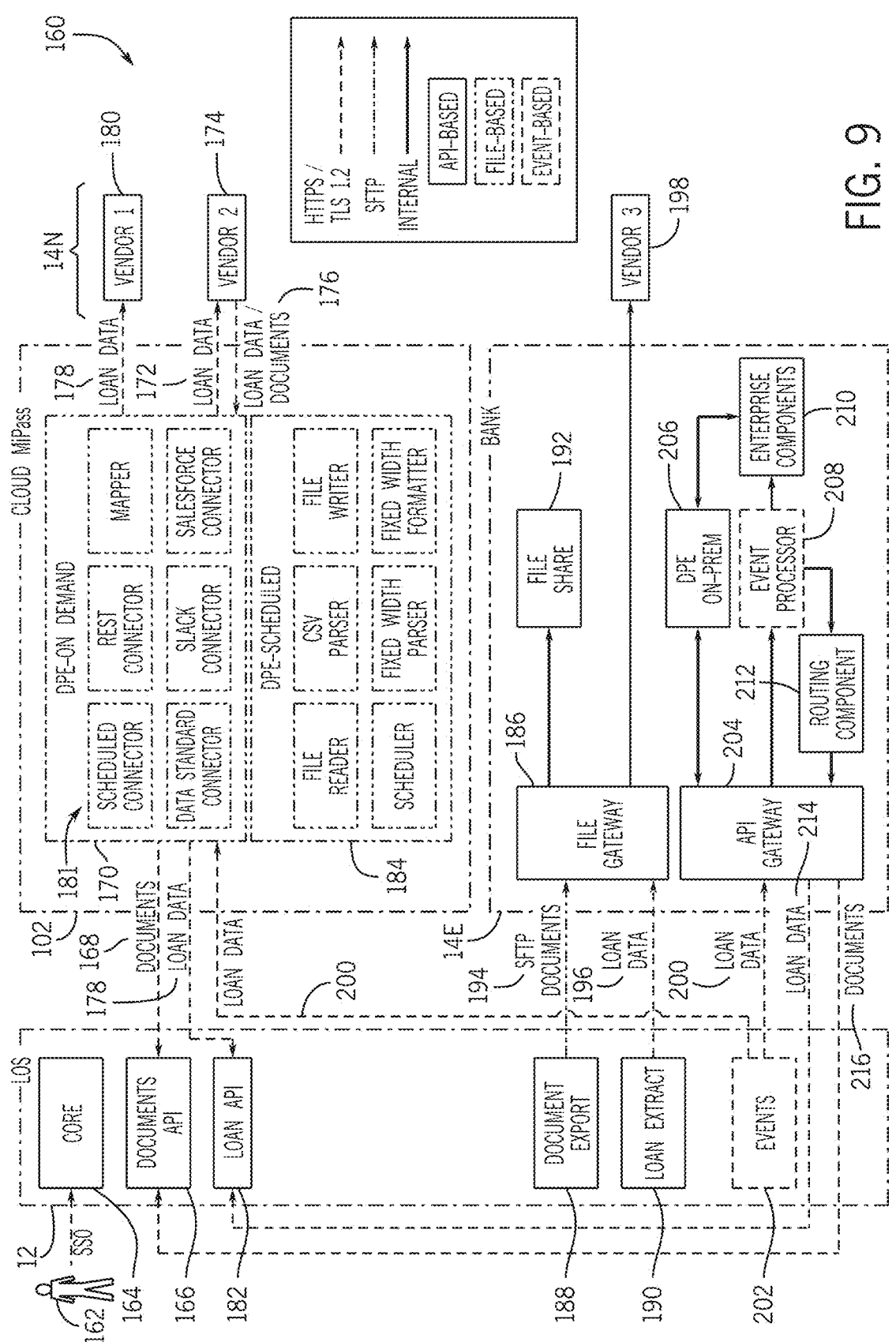
FIG. 9 is a schematic diagram, illustrating data flows of hybrid MiPaas that provides on-premises processing and/or cloud-based processing, based upon data characteristics, in accordance with certain embodiments of the current application.

In some embodiments, the MiPaas may be a hybrid MiPaas that processes integration data partially on premises and partially via cloud services. FIG. 9 is a schematic diagram, illustrating data flows of hybrid MiPaas system 160 that provides on-premises processing and/or cloud-based processing, based upon data characteristics, in accordance with certain embodiments of the current application. As illustrated, an LOS 12 is communicatively coupled to both a cloud-based infrastructure 102 implementing a cloud MiPaas service and an on-premises infrastructure (e.g., banking infrastructure/post closing service 14G) that implements an on-premises MiPaas.

A user 162 may access a platform 164 of the LOS 12 via an authentication mechanism (e.g., via a Single Sign-on (SSO) authentication). From there, LOS 12 events may trigger capture, processing, and/or other use of data from integrated vendor services 14N. As illustrated, in some instances, the integrated vendor services 14N may be integrated into the Cloud MiPaas via the cloud-based infrastructure and some integrated vendor services 14N may be integrated into the on-premises MiPaas via the bank infrastructure 14E.

The LOS 12 may make use of data from both types of integrations. For example, the Documents API 166, which may provide access to document attachments provided by integrated vendor services 14N, may receive documents 168 from an on-demand data processing engine (DPE) 170, which may provide a request for loan data 172 to services 174 of Vendor 2. In response, services 174 may provide resultant loan data/documents 176, which may result in documents 168 being returned to the Documents API 166.

The On-Demand DPE 170 may include several processing widgets 181 that may be used to transform and/or provide received data from one integrated service to another integrated service. For example, data processing triggers may be scheduled (e.g., via the scheduled trigger component) and/or triggered based upon an occurrence of a particular event (e.g., as specified by the Triggered Task component). The occurrence of the particular event may be indicated based upon loan data 200 provided by an LOS External Events feature 202 indicating a particular event's occurrence). The Slack connector provides an example of a communications platform connector that can be used to receive communications data (e.g., Slack messaging data), which may be used in the data processing provided by the On-Demand DPE 170. The Salesforce Connection illustrates an example of a CRM platform connector, which may enable data reception from a CRM system. The Transformer, as discussed herein, provides data field mappings between connectors, when useful. The REST connector provides an example interface connector that is used as an interface translator that defines the type of interface the LOS 12 can use to access the ON-Demand DPE 170.

Resultant data 178 of the On-Demand DPE 170 may be provided to other integrated vendor services 14N (e.g., herein services 180 of Vendor 1) and/or the LOS 12. The services 180 and/or LOS 12 may use this data 178 for downstream processing. For example, the LOS 12 may provide the data 178 for view or use via the Loans API 182.

The Cloud MiPaas may also include a Scheduled DPE 184 that may provide scheduled data processing. For example, a file reader component may be used to receive data and the scheduled trigger component may start a scheduled data processing job on the data provided via a file read by the file reader. The fixed width parser may parse data based upon a specified fixed width, while a fixed width formatter may transform a format of data based upon a specified fixed width. The Comma-separated Values (CSV) parser may parse data based upon comma separation. The file writer component may generate a file output based upon the parsed and formatted data provided via the Scheduled DPE 184 components.

Certain features of the LOS 12 may access on-premises portions of the MiPaas. This may be especially useful when sensitive data may be present that may not be desirable to send out to a cloud-based infrastructure 102. Here, the banking infrastructure 14E may include a file gateway 186 that enables features of the LOS 12 (e.g., a Document export feature 188 and/or a loan export feature 190) to provide data to a file share 192 of the banking infrastructure 14E (e.g., SFTP Documents 194 and Loan Data 196, respectively). The file gateway 186, in some embodiments, may provide some or all of the submitted data to an integrated vendor service 14N that is communicatively coupled with the banking infrastructure 14 E (e.g., services 198 of Vendor 3).

The occurrence of a particular event may be indicated based upon loan data 200 provided by an LOS External Events feature 202 indicating a particular event's occurrence) to an API gateway 204. This may, in turn, trigger processing by the On-Premises DPE 206 and an Event Processors 208, which may provide data to downstream Enterprise Components 210 and/or Routing Components 212 for subsequent processing. Upon completion of the processing, loan data 214 and/or documents 216 may be provided to the loans API feature 182 and/or the Documents API feature 166, respectively.

Figure 10:
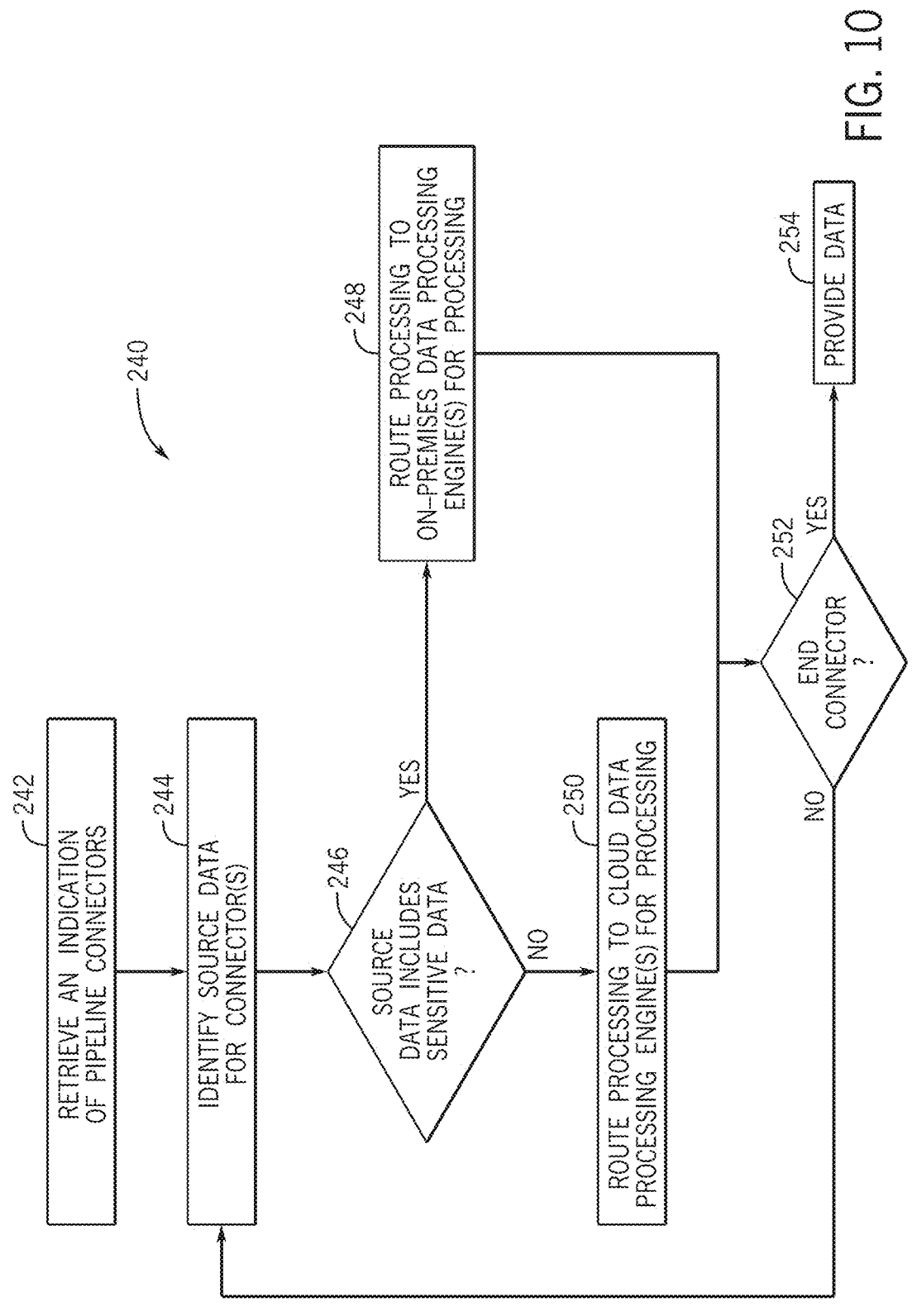
FIG. 10 is a flowchart, illustrating a process for processing data via the hybrid MiPaas of FIG. 9, in accordance with certain embodiments of the current application.

FIG. 10 is a flowchart, illustrating a process 240 for processing data via the hybrid MiPaas of FIG. 9, in accordance with certain embodiments of the current application. The process begins by retrieving an indication of Integration connectors (block 242). As mentioned above, an Integration may be created using a graphical user interface, such as the Integrations Editor GUI 140 of FIG. 7.

The process continues by completing an iterative process sequentially for each connector in the processing Integrations. First, for the current connector, the source data for the connector is identified (block 244). For example, the connector may be analyzed to identify data fields of the connector. FIG. 8 illustrates these data fields for a CRM data connector and an LOS system connector.

A determination is made as to whether the source data includes sensitive data (decision block 246). In some embodiments, it may be desirable to maintain processing of sensitive data on premises (e.g., locally) for security and privacy purposes. Accordingly, if the source data includes sensitive data, the processing is routed to on-premises data processing engines for processing (block 248).

If, however, the source data does not include sensitive data, the processing may be routed to Cloud-based Data Processing Engines for processing (block 250). This may increase processing scalability by providing at least a portion of the MiPaas data processing in a scalable cloud-based infrastructure.

A determination is made as to whether the current connector is an end connector (decision block 252). When the current connector is an end connector, the resultant data is provided as an output of the Integration (block 254). However, when the current connector is not the end connector, the iterative process begins again at block 244 with the next connector becoming the current connector.

Figure 11:
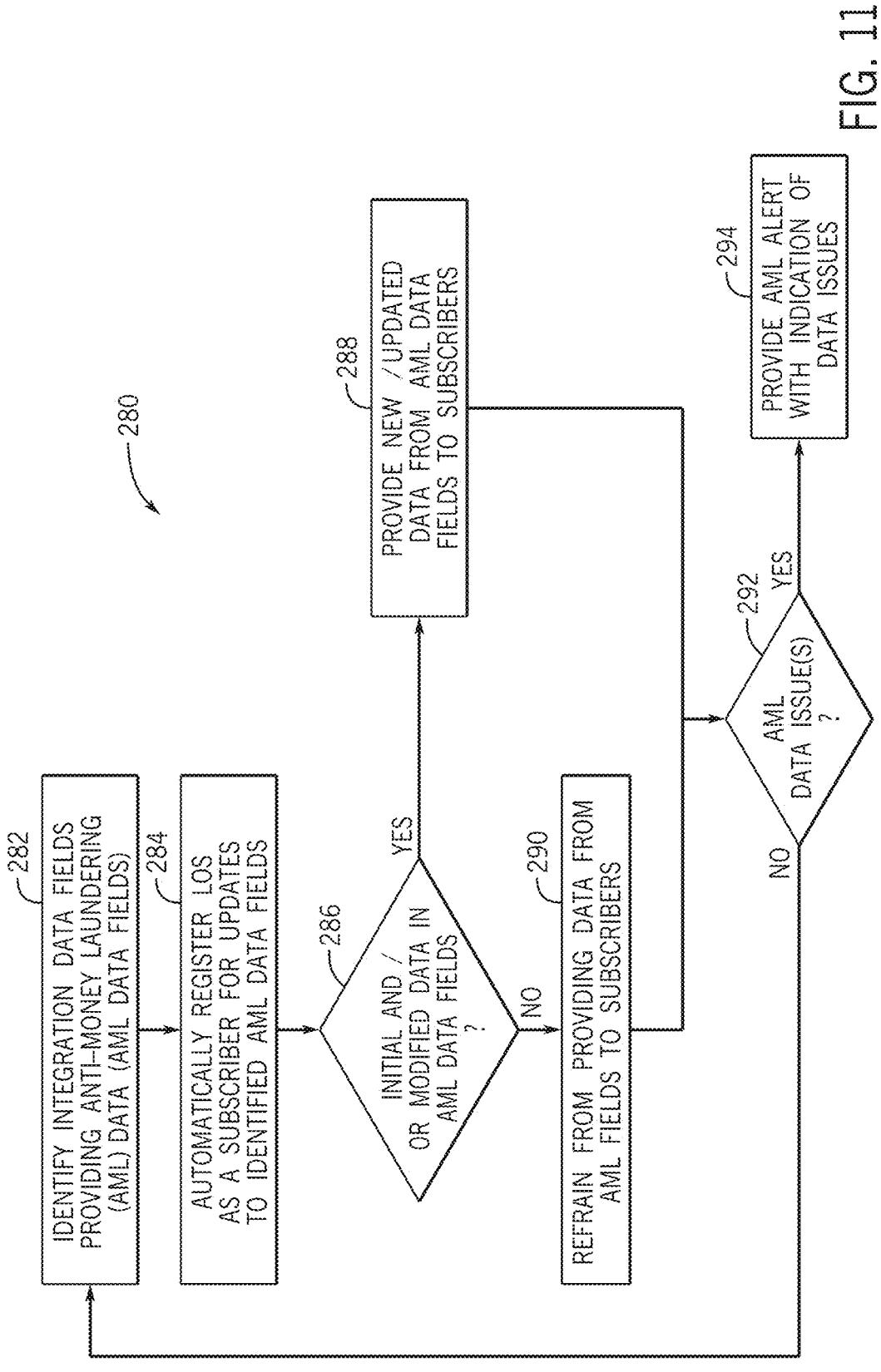
FIG. 11 is a flowchart, illustrating a process for efficient anti-money laundering (AML) processing using MiPaas, in accordance with certain embodiments of the current application.

In many cases, the MiPaas may be used to effectuate customized workflows that perform processing closer to the source of the data, resulting in increased processing efficiencies. FIG. 11 is a flowchart, illustrating a process 280 for efficient anti-money laundering (AML) processing using MiPaas, in accordance with certain embodiments of the current application. The process begins by identifying integration data fields providing anti-money laundering (AML) data (block 282). These fields will be referenced as "AML data fields". AML data fields may be pinpointed using business rules that define particular field names that are associated with AML data collection requirements. In some embodiments, machine learning may be used to pinpoint these data fields, by using training data to identify the types of data/data fields that should be pinpointed.

The LOS is automatically registered as a subscriber for updates to the identified AML data fields (block 284). In this manner, the LOS may be provided data from the AML data fields as it flows through the system.

For efficient processing, only new and/or modified data may be provided to subscribers. To do this, a determination is made as to whether there is initial and/or modified data in the AML data fields (decision block 286). If there is initial and/or modified data in the AML data fields, this data is sent to the subscribers of the AML data fields (block 288). However, if there is no initial and/or modified data in the AML data fields, the process 280 refrains from providing data from the AML fields to the subscribers (block 290).

Periodically, a determination is made as to whether the AML data indicates an AML data issue (decision block 292). When the AML data indicates an AML data issue, an AML alert is provided with an indication of the particular AML data that has caused the data issue (block 294). If not, the process 280 may be periodically re-run to identify if any other AML data fields have been identified and/or whether new initial and/or modified data exists in the AML data fields.

Figure 12:
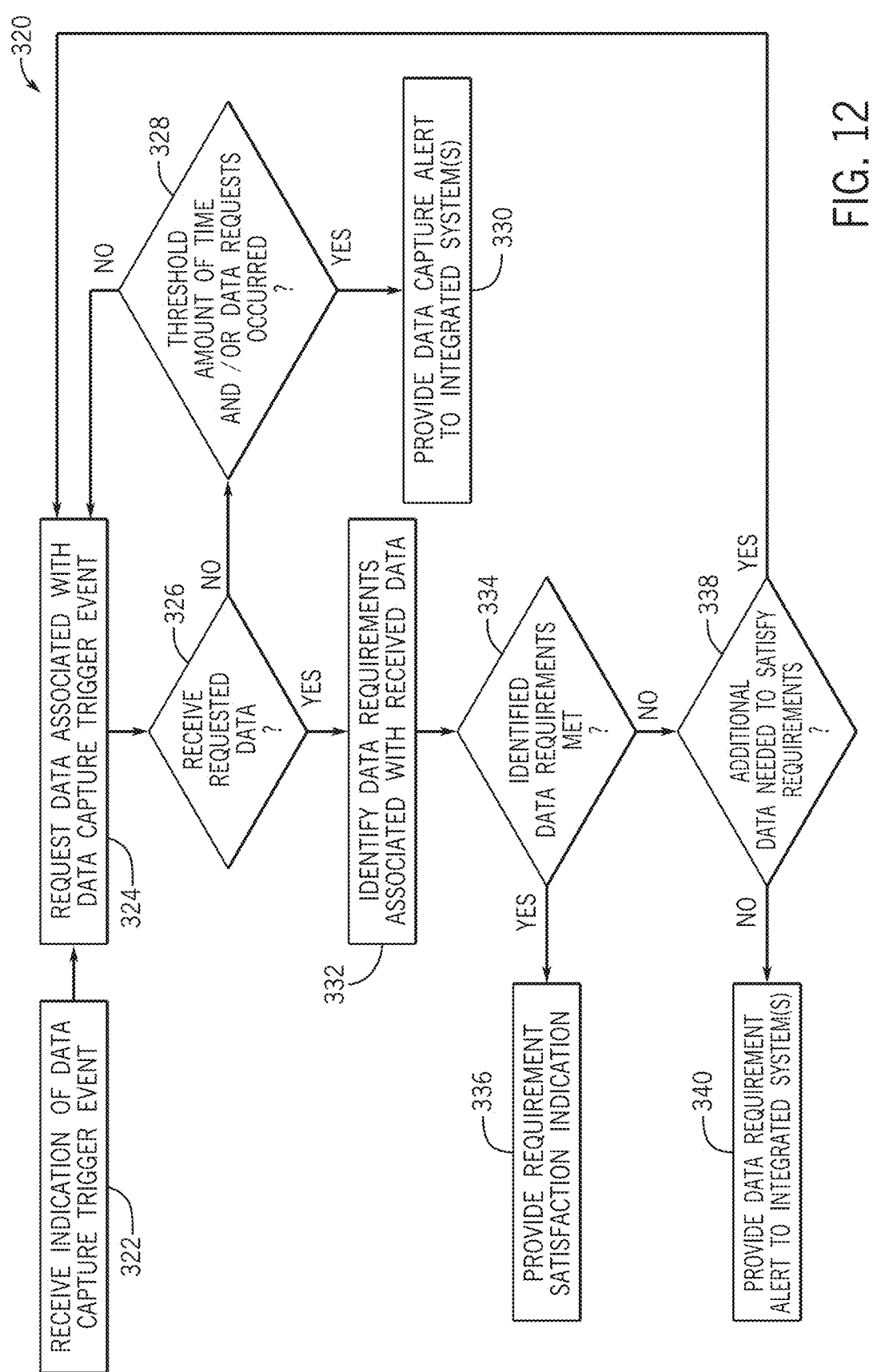
FIG. 12 is a flowchart, illustrating a process for efficient data requirement processing using MiPaas, in accordance with certain embodiments of the current application.

Turning to another example, FIG. 12 is a flowchart, illustrating a process 320 for efficient data requirement processing using MiPaas, in accordance with certain embodiments of the current application. The process 320 begins by receiving an indication of a data capture trigger event (block 322). For example, a new loan account may be generated in the LOS system.

Data associated with the data capture trigger event is requested (block 324). For example, in some embodiments, pay stub documents may be needed to facilitate a loan process. Accordingly, the MiPaas may request these pay stub documents from an integrated vendor service.

A determination is made as to whether the requested data is received (decision block 326). If the requested data is not received, a determination is made as to whether a maximum threshold of time and/or requests for data has occurred (decision block 328). If a threshold amount of time and/or number of data requests has occurred, a data capture alert indicating required data has not been captured may be provided (block 330). For example, if a maximum of 30 days and/or 3 requests is specified, and 31 days and/or a third request has already occurred, the data capture alert may be provided. Otherwise, when a threshold amount of time and/or number of data requests has not occurred, the process returns to block 324 to continue requesting the data associated with the data capture trigger event.

When the requested data is received, data requirements associated with the received data are identified (block 332). For example, a data requirement may include that all pages of the pay stub be included in the document.

A determination is made as to whether the data requirements associated with the received data are met (decision block 334). For example, returning to the requirement that all pages must be included in the document, page numbers provided in the document may be matched with electronic page numbers associated with the electronic document and/or page numbers provided in the document may be checked for sequential numbering to identify whether pages are missing.

If the requirements are met, a requirement satisfaction indication may be provided (block 336). For example, a dashboard UI may provide an indication of the requirement and an associated status indication indicating satisfaction of the requirement.

However, when the identified data requirements are not met, a determination is made as to whether additional data is needed to satisfy the requirements (decision block 338). If so, the process 320 returns to block 324 to request the additional data. However, if additional data will not result in satisfying the requirements, a data requirement alert indicating that a requirement has not been met may be provided (block 340).

MiPaaS can include supportability features such as logging, monitoring, alerting and metrics visualizations that can help IT support teams will the useful troubleshooting and performance optimization information. MiPaaS can simply integrate with the existing Logging/Alerting/Monitoring tools/services/platforms. MiPaaS can also integrate with Messaging/Ticketing/ITSM applications to seamlessly generate tickets and service support messages.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a mortgage integration platform as a service (MiPaas) comprising:
a computer processor and communication circuitry, the MiPaas communicatively integrated with a loan origination system (LOS) via a first integration supported by the communication circuitry and communicatively integrated with a vendor service via a second integration supported by the communication circuitry; and
one or more interface translators configured to provide vendor service data to the LOS via one or more particular interface formats specified by the one or more interface translators, wherein the one or more interface translators comprise:
a representational state transfer (REST) API interface translator providing a REST API interface to the MiPaas;
an OpenAPI interface translator providing an OpenAPI interface to the MiPaas;
a Google Response Procedure Call (gPRC) interface translator providing a gPRC interface to the MiPaas;
a GraphQL interface translator providing a GraphQL interface to the MiPaas; or
any combination thereof; and
wherein the MiPaas is configured to:
receive the vendor service data from the vendor service in a first integration format;
generate formatted vendor data from the received vendor service data in a second integration format; and
integrate the LOS and the vendor service, by providing the formatted vendor data to the LOS, independent of a direct integration between the vendor service and the LOS, wherein the LOS and the vendor service are unable to directly integrate with each other.

2. The system of claim 1, comprising:
a second LOS communicatively integrated with the MiPaas, wherein the MiPaas is configured to provide the vendor service data from the vendor service to the second LOS without a second LOS-specific integration of the vendor service.

3. The system of claim 1, wherein the one or more interface translators comprise an Industry Standard interface translator providing an Industry Data Standards interface to the MiPaas.

4. The system of claim 1, comprising:
a second vendor service communicatively integrated with the MiPaas, independent of an LOS-specific integration.

5. The system of claim 1, comprising:
a second vendor service directly communicatively integrated with the LOS via a third integration, wherein the MiPaas is configured to integrate the LOS, the vendor service, and the second vendor service via the first integration, the second integration, and the third integration.

6. The system of claim 5, wherein the vendor service and the second vendor service provide at least a partial overlap in provided data and the MiPaas is configured to identify a prioritized integration of the second integration and the third integration to receive the partial overlap in provided data.

7. The system of claim 1, wherein the MiPaas comprises:
a first data processing engine implemented in a cloud-based infrastructure, configured to perform first data processing on first data from one or more integrated services; and
a second data processing engine implemented in an on-Premise infrastructure, configured to perform second data processing on second data from one or more integrated services.

8. The system of claim 7, wherein the MiPaas is configured to:
identify non-private information as the first data and route the first data to the first data processing engine; and
identify private information as the second data and route the second data to the second data processing engine.

9. The system of claim 1, wherein the MiPaas is configured to:
identify, from data fields provided by the vendor service, anti-money laundering (AML) data fields that provide AML data;
automatically register the LOS as a subscriber to the AML data fields;
provide initial data, modified data, or both of the AML data fields to the LOS;
determine whether the initial data, modified data, or both indicates an AML data issue; and
when the initial data, modified data, or both indicates an AML data issue, provide an AML alert with an indication of the AML data issue, specifying the initial data, modified data, or both that resulted in the AML data issue.

10. The system of claim 1, wherein the MiPaas is configured to:
receive an indication of a data capture trigger event occurring;
request data associated with the data capture trigger event;
determine whether the requested data is received;
in response to determining that the requested data is not received, re-request the data;
in response to determining that the requested data is received, identify data requirements of the received data and determine whether the data requirements of the received data are met;

when the data requirements are met, provide an indication of satisfaction of the data requirements; and otherwise, when the data requirements are not met, provide a data requirement alert indicating that the data requirements are not satisfied.

11. The system of claim 10, wherein the MiPaas is configured to:

in response to determine that the requested data is not received, re-request the data only up to a threshold number of re-requests, only up to a threshold amount of allotted passed time, or both.

12. A tangible, non-transitory, computer-readable medium, comprising computer-readable instruction that, when executed by one or more processors of a computer, cause the computer to:

implement a mortgage integration platform as a service (MiPaas) comprising a computer processor and communication circuitry, the MiPaas communicatively integrated with a loan origination system (LOS) via a first integration supported by the communication circuitry and communicatively integrated with a vendor service via a second integration supported by the communication circuitry;

provide an interface for the LOS to access vendor service data received from the vendor service via an interface translator configured to provide the vendor service data to the LOS via a particular interface format specified by the interface translator, wherein the interface translator comprises:

a representational state transfer (REST) API interface translator providing a REST API interface to the MiPaas;

an OpenAPI interface translator providing an OpenAPI interface to the MiPaas;

a Google Response Procedure Call (gPRC) interface translator providing a gPRC interface to the MiPaas;

a GraphQL interface translator providing a GraphQL interface to the MiPaas;

an Industry Standard interface translator providing an Industry Data Standards interface to the MiPaas; or any combination thereof; and wherein the MiPaas is configured to:

receive the vendor service data from the vendor service in a first integration format;

generate formatted vendor data from the received vendor service data in a second integration format; and integrate the LOS and the vendor service, by providing the formatted vendor data to the LOS, independent of a direct integration between the vendor service and the LOS, wherein the LOS and the vendor service are unable to directly integrate with each other.

13. The tangible, non-transitory, computer-readable medium of claim 12, comprising computer-readable instruction that, when executed by one or more processors of the computer, cause the computer to:

integrate the LOS, the vendor service, and a second vendor service integrated with the MiPaas via a third integration via the first integration, the second integration, and the third integration.

14. A computer-implemented method, comprising:

implementing a mortgage integration platform as a service (MiPaas) comprising a computer processor and communication circuitry, the MiPaas communicatively integrated with a loan origination system (LOS) via a first integration supported by the communication circuitry and communicatively integrated with a vendor service via a second integration supported by the communication circuitry;

providing an interface for the LOS to access vendor service data received from the vendor service via an interface translator configured to provide the vendor service data to the LOS via a particular interface format specified by the interface translator, wherein the interface translator comprises:

a representational state transfer (REST) API interface translator providing a REST API interface to the MiPaas;

an OpenAPI interface translator providing an OpenAPI interface to the MiPaas;

a Google Response Procedure Call (gPRC) interface translator providing a gPRC interface to the MiPaas;

a GraphQL interface translator providing a GraphQL interface to the MiPaas;

an Industry Standard interface translator providing an Industry Data Standards interface to the MiPaas; or any combination thereof; and receiving the vendor service data from the vendor service in a first integration format;

generating formatted vendor data from the received vendor service data in a second integration format; and integrating the LOS and the vendor service, by providing the formatted vendor data to the LOS, independent of a direct integration between the vendor service and the LOS, wherein the LOS and the vendor service are unable to directly integrate with each other.

15. The computer-implemented method of claim 14, comprising:

identifying, from data fields provided by the vendor service, anti-money laundering (AML) data fields that provide AML data;

automatically registering the LOS as a subscriber to the AML data fields;

providing initial data, modified data, or both of the AML data fields to the LOS;

determining whether the initial data, modified data, or both indicates an AML data issue; and when the initial data, modified data, or both indicates an AML data issue, providing an AML alert with an indication of the AML data issue, specifying the initial data, modified data, or both that resulted in the AML data issue.

16. The computer-implemented method of claim 14, comprising:

receiving an indication of a data capture trigger event occurring;

requesting data associated with the data capture trigger event;

determining whether the requested data is received;

in response to determining that the requested data is not received, re-requesting the data;

in response to determining that the requested data is received, identifying data requirements of the received data and determine whether the requirements of the received data are met;

when the data requirements are met, providing an indication of satisfaction of the data requirements; and otherwise when the data requirements are not met, providing a data requirement alert indicating that the data requirements are not satisfied.

* * * * *